United States Patent
Lahtinen et al.

(10) Patent No.: US 10,428,404 B2
(45) Date of Patent: Oct. 1, 2019

(54) METHOD OF CONVERTING COPPER CONTAINING MATERIAL

(71) Applicant: OUTOTEC (FINLAND) OY, Espoo (FI)

(72) Inventors: Markku Lahtinen, Espoo (FI); Jouni Pihlasalo, Pori (FI); Mikael Jåfs, Kirkkonummi (FI)

(73) Assignee: OUTOTEC (FINLAND) OY, Espoo (FI)

( * ) Notice: Subject to any disclaimer, the term of this patent is extended or adjusted under 35 U.S.C. 154(b) by 78 days.

(21) Appl. No.: 15/308,224

(22) PCT Filed: May 12, 2015

(86) PCT No.: PCT/FI2015/050321
§ 371 (c)(1),
(2) Date: Nov. 1, 2016

(87) PCT Pub. No.: WO2015/173472
PCT Pub. Date: Nov. 19, 2015

(65) Prior Publication Data
US 2017/0058380 A1    Mar. 2, 2017

(30) Foreign Application Priority Data
May 14, 2014   (FI) .................................. 20145435

(51) Int. Cl.
*C22B 15/00* (2006.01)
*C22B 15/06* (2006.01)

(52) U.S. Cl.
CPC ...... *C22B 15/0052* (2013.01); *C22B 15/0028* (2013.01); *C22B 15/0043* (2013.01);
(Continued)

(58) Field of Classification Search
CPC ............ C22B 15/0052; C22B 15/0047; C22B 15/0054; C22B 15/0095; C22B 15/0097
See application file for complete search history.

(56) References Cited

U.S. PATENT DOCUMENTS 3,819,362 A * 6/1974 Bushaw .............. C22B 15/0036
                                                        75/429
2002/0043133 A1   4/2002 Ojima et al.
2004/0244534 A1   12/2004 Kojo et al.

FOREIGN PATENT DOCUMENTS

AU   2009 205 368 B2   5/2014
CL            49583    3/2008
(Continued)

OTHER PUBLICATIONS

DE-2845116-A1 machine translation of the description. (Year: 1980).*

(Continued)

*Primary Examiner* — Tima M. McGuthry-Banks
(74) *Attorney, Agent, or Firm* — Buchanan, Ingersoll & Rooney PC

(57) ABSTRACT

The present invention provides a method of converting copper containing material to blister copper comprising: (a) providing copper containing material comprising copper sulfides and iron sulfides, whereby the copper containing material comprises at least 35 wt % copper of the total weight of the copper containing material; (b) reacting the copper containing material in a furnace with an oxygen containing gas, in the absence of flux, to effect oxidation of iron sulfide and copper sulfide, and controlling injection of the oxygen containing gas and the temperature so that the resulting converter slag is in a molten phase to obtain blister copper and converter slag.

29 Claims, 3 Drawing Sheets

(52) U.S. Cl.
CPC ...... *C22B 15/0047* (2013.01); *C22B 15/0095* (2013.01); *C22B 15/0097* (2013.01)

(56) References Cited

FOREIGN PATENT DOCUMENTS

| CN | 101144123 A | 3/2008 | | |
|---|---|---|---|---|
| DE | 2813209 A1 | * | 10/1979 | ................ C10J 3/57 |
| DE | 2845116 A1 | * | 4/1980 | ............. C01B 17/06 |
| GB | 2 117 410 A | | 10/1983 | |
| WO | WO 2009/090531 A1 | | 7/2009 | |

OTHER PUBLICATIONS

DE-2813209-A1 machine translation of the description. (Year: 1979).*

Davenport and Partelpoeg. Flash Smelting: Analysis, Control and Optimization. Various pp. 200, 204, 213-216, 219, 220. (Year: 1987).*

Davenport et al. Extractive Metallurgy of Copper: Fourth Edition. Various pp. 74, 91, 92, 131-134, 136. (Year: 2002).*

Patterson, Austin. A German-English Dictionary for Chemists: First Edition. p. 161. (Year: 1917).*

Asaki et al. "Oxidation of Molten Copper Matte." Metallurgical Transactions B. vol. 19B. pp. 47-52. (Year: 1988).*

Imris, I; M. Sanchez & G. Achurra. "Copper losses to slags obtained from the El Teniente process." Mineral Processing and Extractive Metallurgy (Trans. Inst. Min. Metall. C) vol. 114, pp. 135-140. doi: 10.1179/037195505X49769. Sep. 2005.*

Taskinen, Pekka; Alan Dinsdale & John Gisby. "Industrial slag chemistry: A case study of computational thermodynamics." Scandinavian Journal of Metallurgy. vol. 34. pp. 100-107 (Year: 2005).*

R. Schuhmann, Jr. "A Survey of the Thermodynamics of Copper Smelting." Journal of Materials (JOM). vol. 2, Issue 6, pp. 873-884. Jun. 1950.*

International Search Report (PCT/ISA/210) dated Jul. 28, 2015, by the European Patent Office as the International Searching Authority for International Application No. PCT/FI2015/050321.

Written Opinion (PCT/ISA/237) dated Jul. 28, 2015, by the European Patent Office as the International Searching Authority for International Application No. PCT/FI2015/050321.

Notification of the First Office Action issued by the State Intellectual Property Office of the People's Republic of China in corresponding Chinese Patent Application No. 201580022598.7 dated Oct. 10, 2018 (12 pages including partial English translation).

Letter dated Aug. 24, 2017 from Chilean associate, reporting an opposition filed by CODELCOTEC SpA against corresponding Chilean PCT National Phase Application No. 2765-2016 (3 pages).

* cited by examiner

METHOD OF CONVERTING COPPER CONTAINING MATERIAL

FIELD OF THE INVENTION

The present invention is in the field of pyrometallurgic copper production and relates to a method of converting copper containing material, such as matte or white metal, to blister copper.

BACKGROUND OF THE INVENTION

The typical process for pyrometallurgic copper production is based on roasting, smelting in furnaces, and converting for production of blister copper. These steps can be followed by further refining of the blister copper into cathode copper. Roasting is performed to reduce impurities, including sulfur, antimony, arsenic, and lead, in the ore and/or concentrate. The roasted product, calcine, serves as a dried and heated charge for the smelting furnace. Smelting of roasted ore concentrate produces matte, a molten mixture of copper sulfide ($Cu_2S$), iron sulfide (FeS), and some heavy metals. Finally, converting the matte yields a high-grade "blister" copper, with 97.5 to 99.5% copper. Matte from the smelting furnace is charged to converters, where the molten material is oxidized in the presence of air to remove iron and sulfur impurities as converter slag and gaseous sulfur dioxide and to form blister copper. Typically a flux is added and air is blown through the molten mixture to remove residual sulfur. Typically, blister copper is then fire-refined in an anode furnace, cast into "anodes", and sent to an electrolytic refinery for further impurity elimination.

For converting, the Pierce-Smith and Hoboken converters are the most common processes. Pierce-Smith converters are refractory-lined cylindrical steel shells mounted on trunnions at either end, and rotated about the major axis for charging and pouring. An opening in the center of the converter functions as a mouth through which molten matte, siliceous flux, and scrap copper are charged and gaseous products are vented. Air, or oxygen-rich air, is blown through the molten matte. Iron sulfide is oxidized to form iron oxides ($FeO_x$) and $SO_2$. Blowing and slag skimming continue until an adequate amount of relatively pure $Cu_2S$, called "white metal", accumulates in the bottom of the converter. A final air blast ("final blow") oxidizes the copper sulfide to $SO_2$, and blister copper forms, containing 98 to 99% copper. The blister copper is removed from the converter for subsequent refining. The $SO_2$ produced throughout the operation is vented to pollution control devices. In the Mitsubishi process the flux is typically limestone ($CaCO_3$) resulting in a CaO comprising slag. The slag also typically comprises 12 to 18% copper, mostly as $Cu_2O$, which can be recycled into the smelting furnace to optimize Cu yield.

Flash furnace smelting combines the operations of roasting and smelting to produce a high grade copper matte from concentrates and flux. In flash smelting, dried ore concentrates and finely ground fluxes are injected together with oxygen, preheated air, or a mixture of both, into a furnace maintained at approximately 1000° C. There are also a number of processes such as Noranda and Mitsubishi, which replace roasting, smelting and converting. As with the Noranda process reactor, and in contrast to reverberatory and electric furnaces, flash furnaces use the heat generated from partial oxidation of their sulfide charge to provide much or all of the required heat.

Flux utilized in the smelting and/or converting steps renders the converting slag more liquid and thus allows lower possible operating temperatures, however the use of it also results in additional energy consumption.

BRIEF DESCRIPTION OF THE INVENTION

An object of the present invention is thus to provide a method of converting copper containing material to blister copper in the absence of flux. The objects of the invention are achieved by a method which is characterized by what is stated in the Independent claims. The preferred embodiments of the invention are disclosed in the dependent claims.

It was surprisingly realized that the use of flux can be avoided when the conversion step is carried out at an oxidation level where part of the copper comprised in the copper containing material is oxidized to copper oxide. The presence of copper oxide assists in liquefying the converter slag and no added conventional flux is required.

The present invention makes it feasible to run any converting process, in particular flash converting, in the absence of flux. The process may be used for copper containing materials having high copper content, such as matte and/or white metal, where the copper concentration is at least 35 wt % and results in bister copper having below 0.15% S in blister, preferably 0.06 to 0.10% S in blister.

An advantage of the method of the present invention is that energy consumption related to smelting of the fluxes can be avoided. Further, no oxidation step is needed in the fire refining of copper to remove extra sulfur from blister copper. Fluxless slag is also a better coolant in flash smelting than conventional calcium ferrite slag allowing more concentrate to be fed to a flash smelting furnace.

BRIEF DESCRIPTION OF THE DRAWINGS

In the following the invention will be described in greater detail by means of preferred embodiments with reference to the attached [accompanying] drawings, in which.

DETAILED DESCRIPTION OF THE INVENTION

Figure 1:
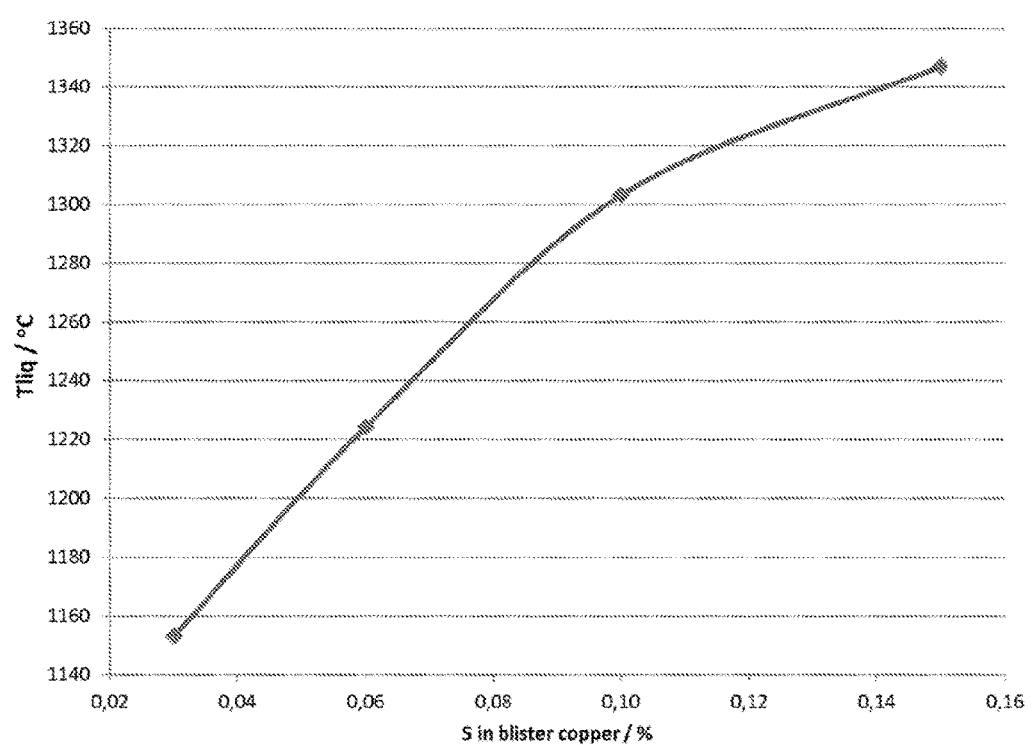
FIG. 1 is a graph illustrating liquidus temperature of the slag as a function of degree of oxidation.

The present invention provides a method of converting copper containing material to blister copper comprising:

(a) providing copper containing material comprising copper sulfides and iron sulfides, whereby the copper containing material comprises at least 35 wt % copper of the total weight of the copper containing material;

(b) reacting the copper containing material in a furnace with an oxygen containing gas, in the absence of flux, to effect oxidation of iron sulfide and copper, and controlling injection of the oxygen containing gas and the temperature so that the resulting converter slag is in molten phase to obtain blister copper and converter slag.

The process of the present invention is particularly suitable for copper containing materials having high copper content, such as matte and/or white metal, where the copper concentration is at least 35 wt %, in particular from 40 to 78 wt %, more preferably from 55 to 75 wt %, of the total weight of the copper containing material. The method of the present invention is in particular suitable for copper containing material that comprises copper, iron and sulfur.

Typically these components are present as a mixture copper sulfide ($Cu_2S$) and iron sulfide (FeS). Matte is a preferred example of such copper containing materials. The copper containing material may also comprise minor amounts of other components such as Pb, Zn, Ni, As, Co, Sb, Ag, Au, Pt, Pd and/or Bi as well as trace elements depending on the raw materials used in the particular smelter. The method of the present invention allows higher copper scrap loading of the feed.

The copper containing material treated by the process of the invention is typically produced by roasting and smelting copper containing ore and/or concentrate. Thus the exact composition of the copper containing material is dependent on the nature of the copper containing ore and/or concentrate provided to the previous processing steps such as roasting and smelting.

The reaction is typically conducted in a furnace and the blister copper forms a layer on the bottom of the furnace with the slag floating on the top. When the copper containing material is reacted with oxygen containing gas in the conversion step iron comprised in the copper containing material oxidizes producing, solid iron oxide phase. Simultaneously sulfur comprised in the copper containing material is oxidized producing gaseous sulfur dioxide which can be treated in an acid plant.

The conversion of sulfides into oxides is dependent on the local oxygen concentration and temperature. Oxygen can be introduced into the converting step (b) for example as oxygen enriched air, pure oxygen or any mixtures thereof, preferably as oxygen enriched air. The required amount of oxygen in the converting step (b) depends on the sulfide and copper concentration of the copper containing material as well as desired copper concentration in slag and desired sulfur concentration of obtained blister.

The oxygen partial pressure ($pO_2$) is in step (b) is further dependent on the nature of the copper containing material, the desired copper concentration of the converter slag, and the desired sulfur concentration of the blister copper. The oxygen partial pressure is typically from 1 to 100 Pa, preferably from 2 to 70 Pa, more preferably from 10 to 30 Pa.

Desirably the copper containing material is oxidized to convert a part of the copper comprised in the copper containing material into copper oxide. The presence of copper oxide in the converter slag assists in liquefying the converter slag. It is desirable to oxidize the copper containing material to attain at least 30 wt % of oxidized copper in the converter slag of the total weight of the converter slag. The desired ratio can be achieved by injecting oxygen containing gas into the conversion furnace at suitable oxygen partial pressure ($pO_2$) as discussed above. Preferably the concentration of oxidized copper the converter slag from 30 to 90 wt %, more preferably from 35 to 70 wt %, most preferably from 49 to 60 wt %, of the total weight of the converter slag.

By performing the invention it is possible to convert copper containing material to blister copper without use of conventional flux. The term "flux" as used herein and hereafter refers to conventional additives, also known as slag builders, added to the contents of a smelting and/or converting furnace for the purpose of rendering slag more liquid at the smelting temperature i.e. reducing slag viscosity with temperature, and increasing the flow of slag in smelting. Typical examples of flux in copper production include in particular silicon dioxide ($SiO_2$), calcium oxide (CaO), and/or calcium carbonate ($CaCO_3$).

The desired temperature of the converting step (b) is dependent on the desired concentration of oxidized copper in the converter slag. The temperature is typically at least 1200° C. to ensure that the slag is in a molten phase and to attain acceptable yield of copper. When lower concentration of copper oxide is present in the converter slag higher temperature is required. The temperature is preferably from 1220 to 1450° C., more preferably from 1250 to 1400, most preferably from 1300 to 1380° C.

Figure 2:
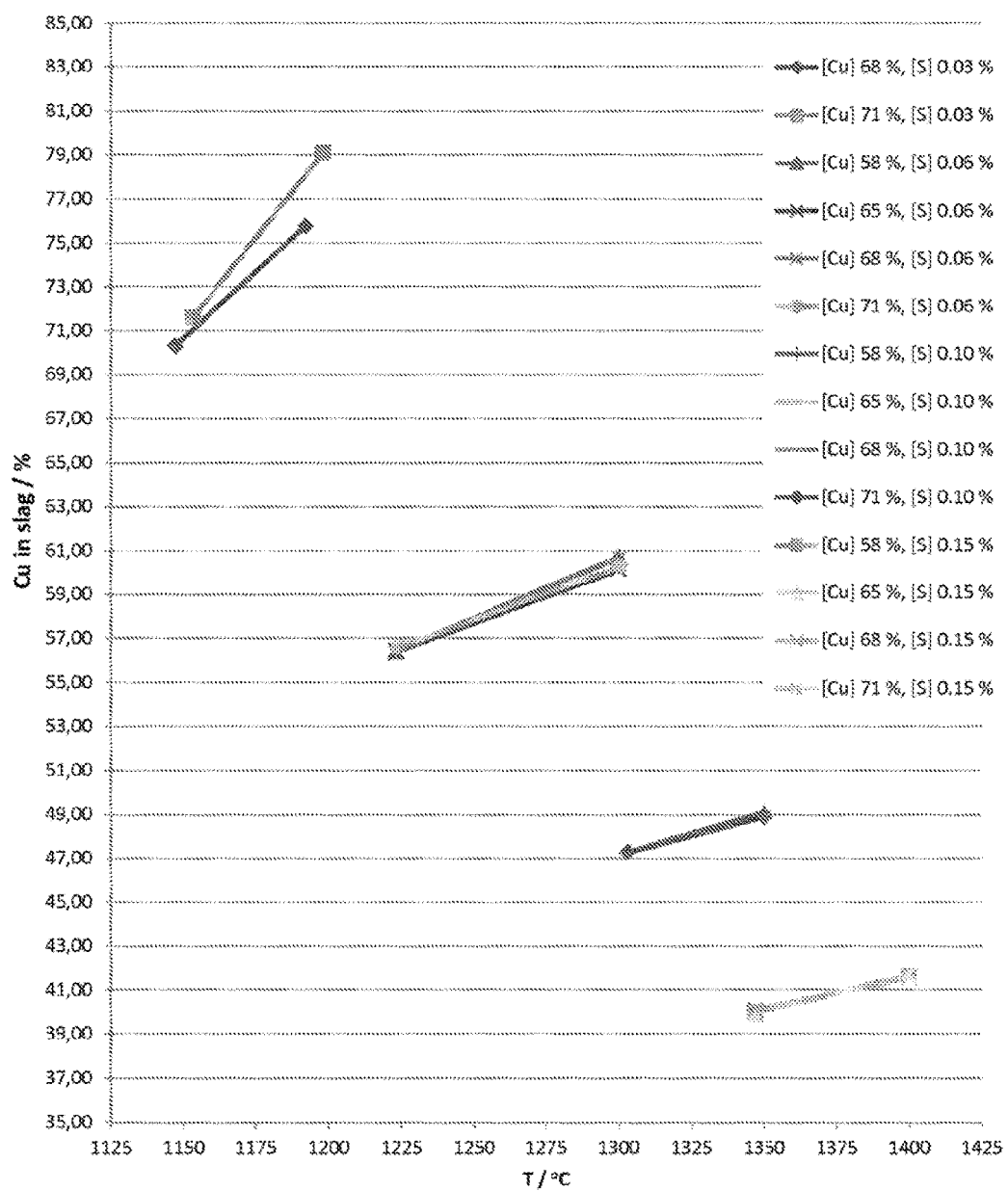
FIG. 2 is a graph illustrating desired copper content of the slag as a function of temperature.
Figure 3:
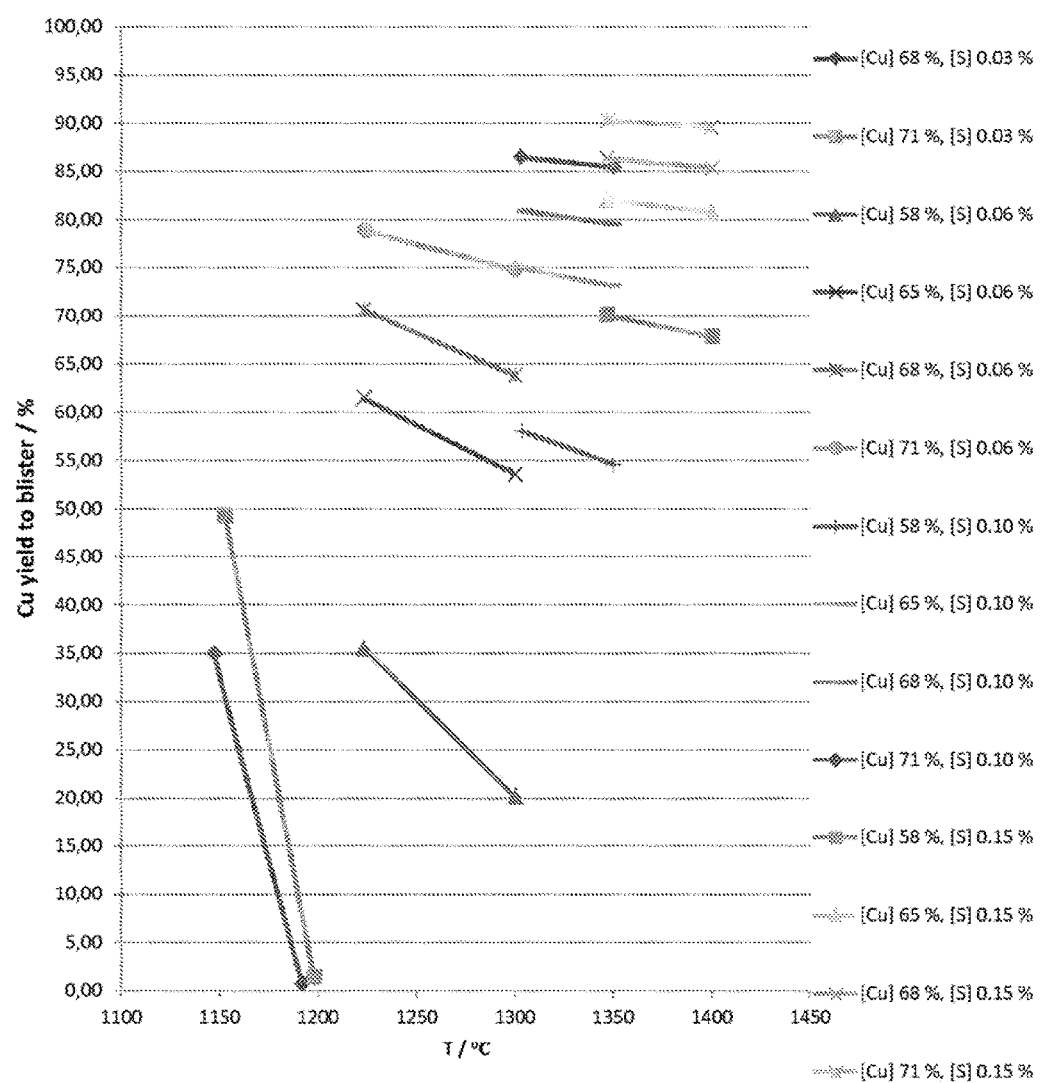
FIG. 3 is a graph illustrating copper yield to blister as a function of temperature.

FIG. 1 illustrates the liquidus temperature of the slag as a function of degree of oxidation of the blister copper; FIG. 2 illustrates the dependency of the operating temperature of the concentration of copper in the converter slag; and FIG. 3 the copper yield to blister as a function of temperature.

The method of the present invention may be performed as a separate process step or as an integrated part of a process that combines converting with one or several other process steps such as roasting and smelting. Preferably the method of the present invention is performed as an integrated part of a flash smelting process. Accordingly the converting step (b) can be performed in any furnace found suitable by a person skilled in the art. The converting step (b) is typically performed as suspension smelting or bath smelting, in particular as suspension smelting. The converting step can for example be accomplished in a furnace selected from the group consisting of flash converting furnace (FCF), Pierce-Smith converting furnace (PS), Mitsubishi converting furnace, top submerged lance converting furnace (TSL), and SKS converting furnace. FCF is particularly suitable as it allows continuous operation and better recovery of off-gases.

The method of the present invention enables efficient oxidation of sulfur during the smelting process and thus reduces in the amount of sulfur in the blister copper and avoids possible final sulfur removal typically carried out in anode furnaces by air oxidation and allows continuous reductive operation of the anode furnace. Also launder emissions in the transfer of blister copper from converting furnace to anode furnace are reduced.

EXAMPLE

Example 1

The following example illustrates by estimation a FCF process where no fluxes are used. The slag consists only of iron and copper oxides with small amount of sulfur. Liquidus temperatures of the FCF slag and primary solid phases were calculated for four matte compositions shown in Table 1 below at 0.03, 0.06, 0.10, and 0.15% S in blister copper. The results are shown in FIG. 1. The composition of the slag was calculated as a function of temperature. The results as copper content of the slag are presented in FIG. 2. The copper yields were calculated for different degrees of oxidation and copper grades of the matte. The results are presented in FIG. 3.

TABLE 1

| Component | A | B | C | D |
|---|---|---|---|---|
| CaO | 0 | 0 | 0 | 0 |
| $SiO_2$ | 0 | 0 | 0 | 0 |
| Cu | 58 | 65 | 68 | 71 |
| Fe | 17.23 | 11.57 | 9.19 | 6.84 |
| S | 23.66 | 22.81 | 22.33 | 21.78 |
| $O_2$ | 1.11 | 0.62 | 0.48 | 0.38 |

As can be seen from the estimation, the converting step of the present invention can be performed in the absence of a conventional flux.

It will be obvious to a person skilled in the art that, as the technology advances, the inventive concept can be implemented in various ways. The invention and its embodiments are not limited to the examples described above but may vary within the scope of the claims.

The invention claimed is:

1. A method of converting copper containing material to blister copper comprising the following steps:
    (a) providing copper containing material comprising copper sulfides and iron sulfides, whereby the copper containing material comprises at least 35 wt % copper of the total weight of the copper containing material;
    (b) reacting the copper containing material in a furnace with an oxygen containing gas, in the absence of flux, to effect oxidation of iron sulfide and copper sulfide, and controlling injection of the oxygen containing gas and the temperature so that a resulting converter slag is in a molten phase to obtain blister copper and converter slag, wherein in step (b) the oxygen partial pressure (pO2) is from 1 to 100 Pa.

2. The method as claimed in claim 1, wherein in step (b) the temperature is at least 1200° C.

3. The method as claimed in claim 1, wherein in step (b) a concentration of oxidized copper the converter slag is at least 30 wt %.

4. The method as claimed in claim 1, wherein sulfur concentration of obtained blister is less than 0.15 wt % S in blister.

5. A method as claimed in claim 1, wherein the copper containing material comprises from 40 to 78 wt % copper of the total weight of the copper containing material.

6. The method as claimed in claim 1, wherein the copper containing material is selected from matte, white metal and mixtures thereof.

7. The method as claimed in claim 1, wherein the converting step (b) is performed as suspension smelting or bath smelting.

8. The method as claimed in claim 1, wherein the conversion is accomplished by flash converting furnace (FCF).

9. The method as claimed in claim 1, wherein the conversion is accomplished by Pierce-Smith converting furnace (PS).

10. The method as claimed in claim 1, wherein oxygen containing gas is oxygen enriched air, pure oxygen and any mixtures thereof.

11. The method as claimed in claim 1, wherein in step (b) the oxygen partial pressure (pO$_2$) is from 10 to 30 Pa.

12. The method as claimed in claim 1, wherein in step (b) the temperature is from 1300 to 1400° C.

13. The method as claimed in claim 1, wherein in step (b) a concentration of oxidized copper the converter slag is from 40 to 60 wt % of the total weight of the converter slag.

14. The method as claimed in claim 1, wherein sulfur concentration of obtained blister is 0.06 to 0.10 wt % S in blister.

15. A method as claimed in claim 1, wherein the copper containing material comprises at from 55 to 75 wt % copper of the total weight of the copper containing material.

16. A method of converting copper containing material to blister copper comprising the following steps:
    (a) providing copper containing material comprising copper sulfides and iron sulfides, whereby the copper containing material comprises at least 35 wt % copper of the total weight of the copper containing material;
    (b) reacting the copper containing material in a furnace with an oxygen containing gas, in the absence of flux, to effect oxidation of iron sulfide and copper sulfide, and controlling injection of the oxygen containing gas and the temperature so that a resulting converter slag is in a molten phase to obtain blister copper and converter slag, wherein in step (b) a concentration of oxidized copper the converter slag is at least 30 wt %, and wherein in step (b) the oxygen partial pressure (pO$_2$) is from 1 to 100 Pa.

17. The method as claimed in claim 16, wherein in step (b) the temperature is at least 1200° C.

18. The method as claimed in claim 16, wherein sulfur concentration of obtained blister is less than 0.15 wt % S in blister.

19. A method as claimed in claim 16, wherein the copper containing material comprises from 40 to 78 wt % copper of the total weight of the copper containing material.

20. The method as claimed in claim 16, wherein the copper containing material is selected from matte, white metal and mixtures thereof.

21. The method as claimed in claim 16, wherein the converting step (b) is performed as suspension smelting or bath smelting.

22. The method as claimed in claim 16, wherein the conversion is accomplished by flash converting furnace (FCF).

23. The method as claimed in claim 16, wherein the conversion is accomplished by Pierce-Smith converting furnace (PS).

24. The method as claimed in claim 16, wherein oxygen containing gas is oxygen enriched air, pure oxygen and any mixtures thereof.

25. The method as claimed in claim 16, wherein in step (b) the oxygen partial pressure (pO$_2$) is from 10 to 30 Pa.

26. The method as claimed in claim 16, wherein in step (b) the temperature is from 1300 to 1400° C.

27. The method as claimed in claim 16, wherein in step (b) a concentration of oxidized copper the converter slag is from 40 to 60 wt % of the total weight of the converter slag.

28. The method as claimed in claim 16, wherein sulfur concentration of obtained blister is 0.06 to 0.10 wt % S in blister.

29. A method as claimed in claim 16, wherein the copper containing material comprises at from 55 to 75 wt % copper of the total weight of the copper containing material.

* * * * *